(12) United States Patent
Nishimura et al.

(10) Patent No.: US 6,415,214 B2
(45) Date of Patent: Jul. 2, 2002

(54) AUTOMATIC TRANSMISSION OF VEHICLE

(75) Inventors: Nobuyuki Nishimura; Tetsuya Shimizu, both of Kawasaki (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/802,042

(22) Filed: Mar. 8, 2001

(30) Foreign Application Priority Data

Mar. 14, 2000 (JP) ........................................ 2000-076370

(51) Int. Cl.$^7$ ........................... G06F 17/00; G06F 19/00
(52) U.S. Cl. ........................... 701/51; 701/22; 180/65.6
(58) Field of Search ........................... 701/22, 51, 55, 701/56; 180/65.1, 65.6, 65.7; 477/15, 20

(56) References Cited

U.S. PATENT DOCUMENTS

| | | | |
|---|---|---|---|
| 5,157,608 A | * | 10/1992 | Sankapl et al. ............... 701/51 |
| 5,772,554 A | * | 6/1998 | Tabata ........................ 477/109 |
| 5,884,201 A | * | 3/1999 | Kawai ......................... 701/22 |

* cited by examiner

*Primary Examiner*—Gertrude Arthur
(74) *Attorney, Agent, or Firm*—McCormick, Paulding & Huber LLP (57) ABSTRACT

An automatic transmission arrangement includes TMCU (9) for automatically shifting a transmission (3) according to a gear position change signal issued from a manual shift switch (29a). TMCU (9) also automatically disengages a clutch (2) when automatic shifting takes place, and automatically engages the clutch (2) when accelerator pedal depression (8) exceeds a predetermined value in a clutch disengaged condition. TMCU (9) further decides a most appropriate gear in accordance with a current vehicle running condition, selects a higher one of the most appropriate gear and a predetermined start gear as a target gear, and shifts the transmission (3) to the target gear regardless of the gear position change signal from the manual shift switch (29a) when the accelerator pedal depression (8) exceeds a prescribed amount in the clutch disengaged condition, and then engages the clutch (2).

20 Claims, 6 Drawing Sheets

AUTOMATIC TRANSMISSION OF VEHICLE

CROSS REFERENCES TO RELATED APPLICATION

The instant application claims priority under 35 USC 119 of Japanese Patent Application No. 2000-76370 filed on Mar. 14, 2000, the entire disclosure of which is incorporated herein by reference.

BACKGROUND OF THE INVENTION

1. Field of the Invention

The present invention relates to an automatic transmission loaded on a large vehicle such as a tractor-trailer.

2. Description of the Related Art

Recently, many large vehicles such as tractor-trailers, trucks and lorries are equipped with an automatic clutch and automatic transmission in order to lighten a driver's burden. A controller associated with the automatic transmission selects a most appropriate transmission gear position in accordance with vehicle speed from a map, and the transmission is automatically shifted up and down in response to acceleration and deceleration of the vehicle.

Some of such automatic transmissions are further equipped with a manual mode which allows a driver to manually shift the transmission according to a shift lever movement. In the manual mode, unless the driver shifts the transmission with the shift lever, a current transmission gear position is maintained. The shift lever movement made by the driver only causes the transmission gear position change.

Generally, such automatic transmissions have an automatic clutch device, which automatically disengages and engages a friction clutch by an actuator.

In the manual mode, the conventional arrangement has a following problem. For example, when a vehicle is decelerated to a low speed while a relatively high speed gear is being maintained, the clutch is automatically disengaged to avoid engine stalling, and the disengaged condition is kept. After that, when an accelerator pedal is stamped to accelerate the vehicle, the clutch is automatically engaged. However, since the transmission gear position is high, the engine stalls upon clutch engagement or the clutch excessively slips. This hinders smooth driving, and damages the clutch.

SUMMARY OF THE INVENTION

An object of the present invention is to prevent an engine from stalling and a clutch from being damaged when a vehicle is accelerated after deceleration when a transmission is in a manual mode.

According to one aspect of the present invention, there is provided an automatic transmission apparatus including a controller for automatically shifting a transmission according to a gear position change signal issued from a manual shift switch. This controller (or second controller) also automatically disengages a clutch when automatic shifting takes place, and automatically engages the clutch when accelerator pedal depression exceeds a predetermined value in a clutch disengaged condition. The controller (or third controller) further decides a most appropriate gear in accordance with a current vehicle running condition, selects a higher one of the most appropriate gear and a predetermined start gear as a target gear, and shifts the transmission to the target gear regardless of the gear position change signal from the manual shift switch when the accelerator pedal depression exceeds a prescribed amount in the clutch disengaged condition, and then engages the clutch.

The most appropriate gear may be decided in a map from current accelerator pedal depression and a rotation speed of an output shaft of the transmission.

The gear position change signal may be issued from the manual shift switch in response to a shift lever movement.

The clutch may be disengaged when a rotation speed of an input shaft of the transmission drops below a value near an engine idling rotation speed.

Other objects, aspects and advantages of the present invention will become apparent to those skilled in the art to which the invention pertains from the subsequent detailed description and the appended claims, taken in conjunction with the accompanying drawings.

DETAILED DESCRIPTION OF THE INVENTION

While the present invention will be described in connection with a preferred embodiment thereof, it should be understood that it is not intended to limit the invention to that embodiment.

An embodiment of the present invention will now be described with reference to the accompanying drawings.

Figure 2:
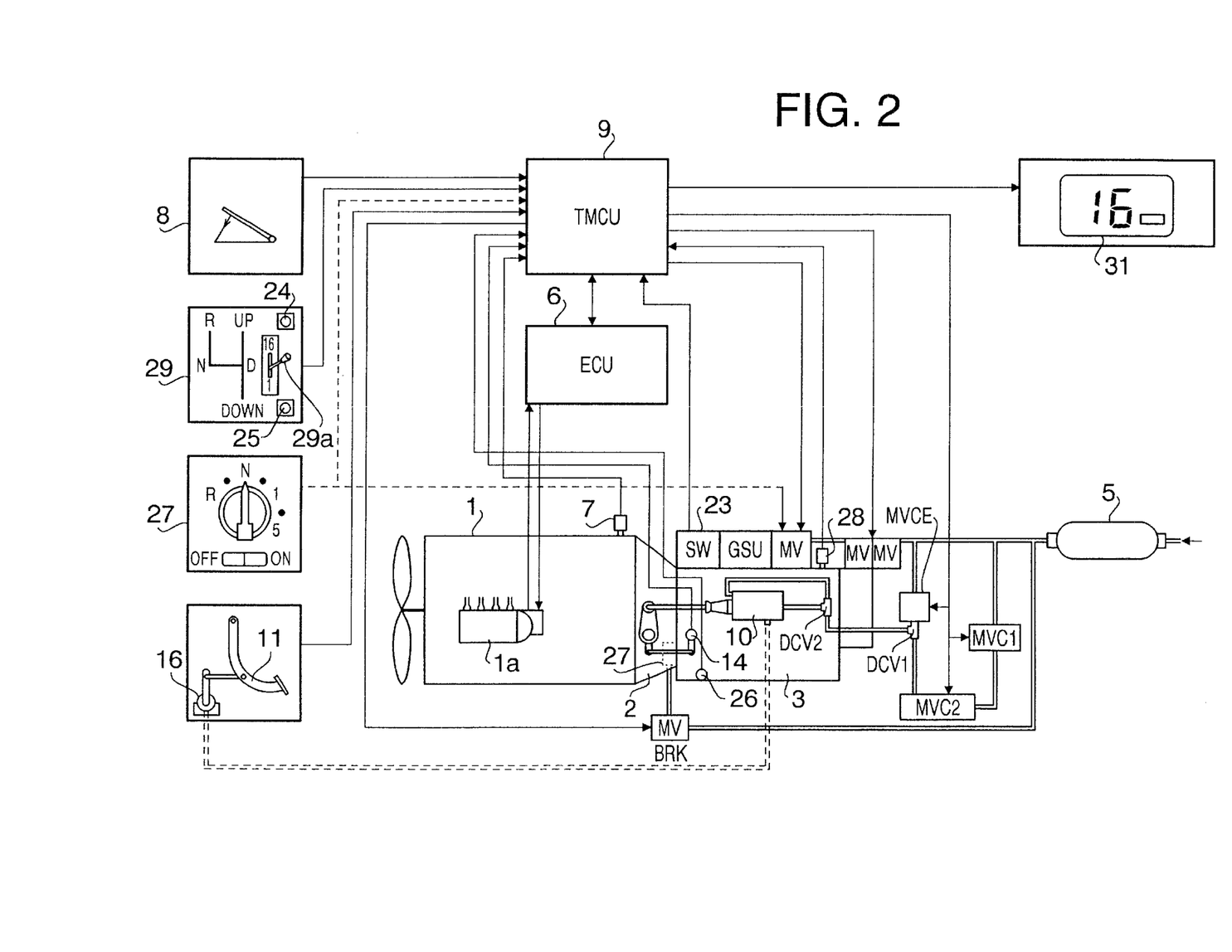
FIG. 2 illustrates an engine drive power transmitting system of a vehicle to which the present invention is applied.

Referring first to FIG. 2, illustrated is an automatic transmission 3 according to the present invention, which is installed in a tractor-trailer with a diesel engine 1. The transmission 3 is coupled with the engine 1 via a clutch 2, and an output shaft 4 (FIG. 3) of the transmission 3 is connected to a propeller shaft (not shown) to drive rear wheels (not shown). The engine 1 is electronically controlled by an engine control unit (ECU) 6. Specifically, ECU 6 reads a current engine revolution speed and engine load from outputs of an engine rotation sensor 7 and accelerator opening sensor (accelerator pedal depression sensor) 8, and determines primarily from these outputs timing of fuel injection and an amount of fuel injection from a fuel injection pump 1a.

Figure 3:
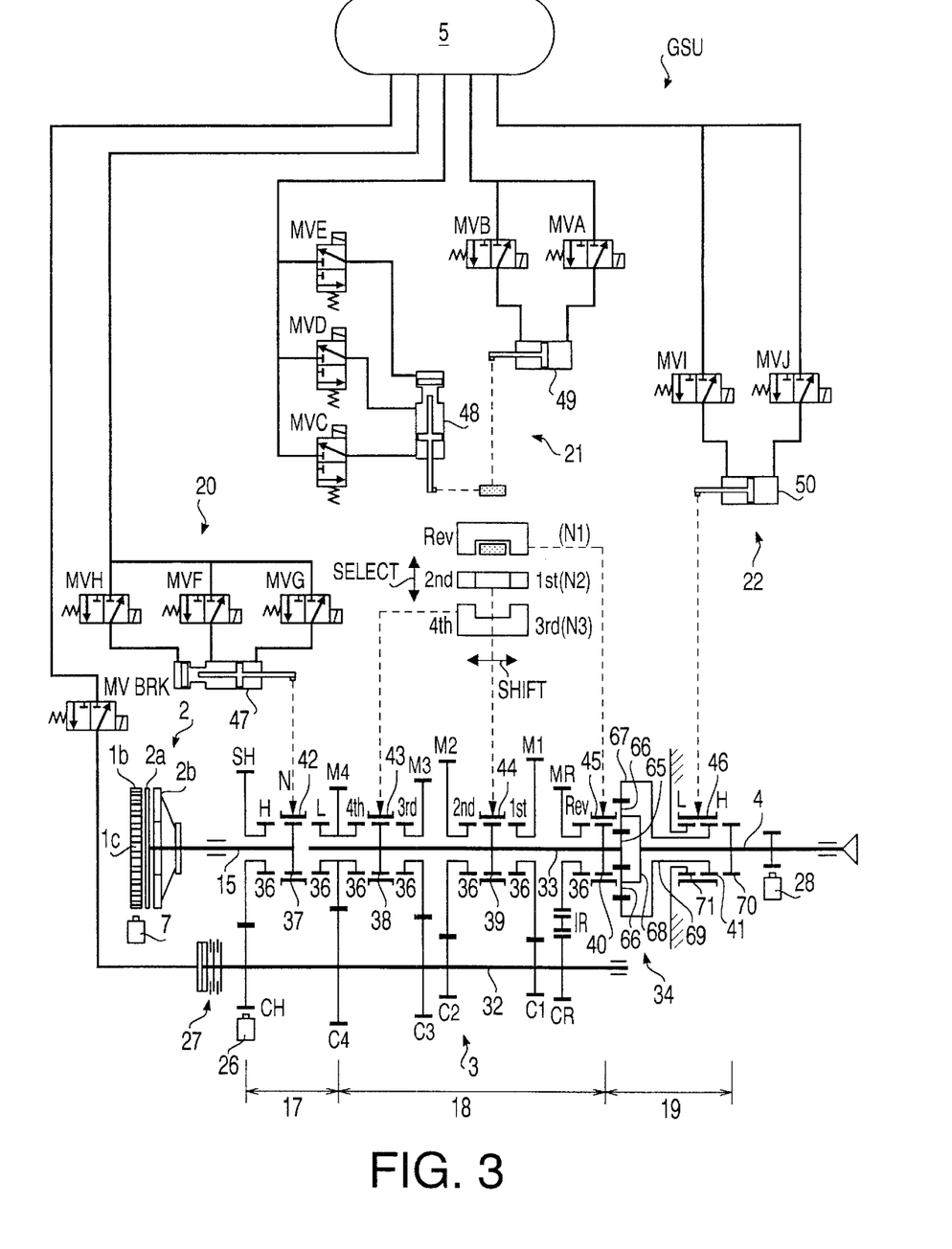
FIG. 3 illustrates an automatic transmission employed in the system shown in FIG. 2.

As illustrated in FIG. 3, a flywheel 1b is mounted on a crankshaft of the engine 1, and a ring gear 1c is formed along the periphery of the flywheel 1b. As the teeth of the ring gear 1c pass by the engine revolution speed sensor 7, the sensor 7 outputs pulses. ECU 6 counts the number of the pulses per unit time to calculate the engine revolution speed.

Referring back to FIG. 2, the clutch 2 and transmission 3 are automatically controlled by a transmission control unit (TMCU) 9. ECU 6 and TMCU 9 are connected to each other over a bus and communicate with each other.

Figure 4:
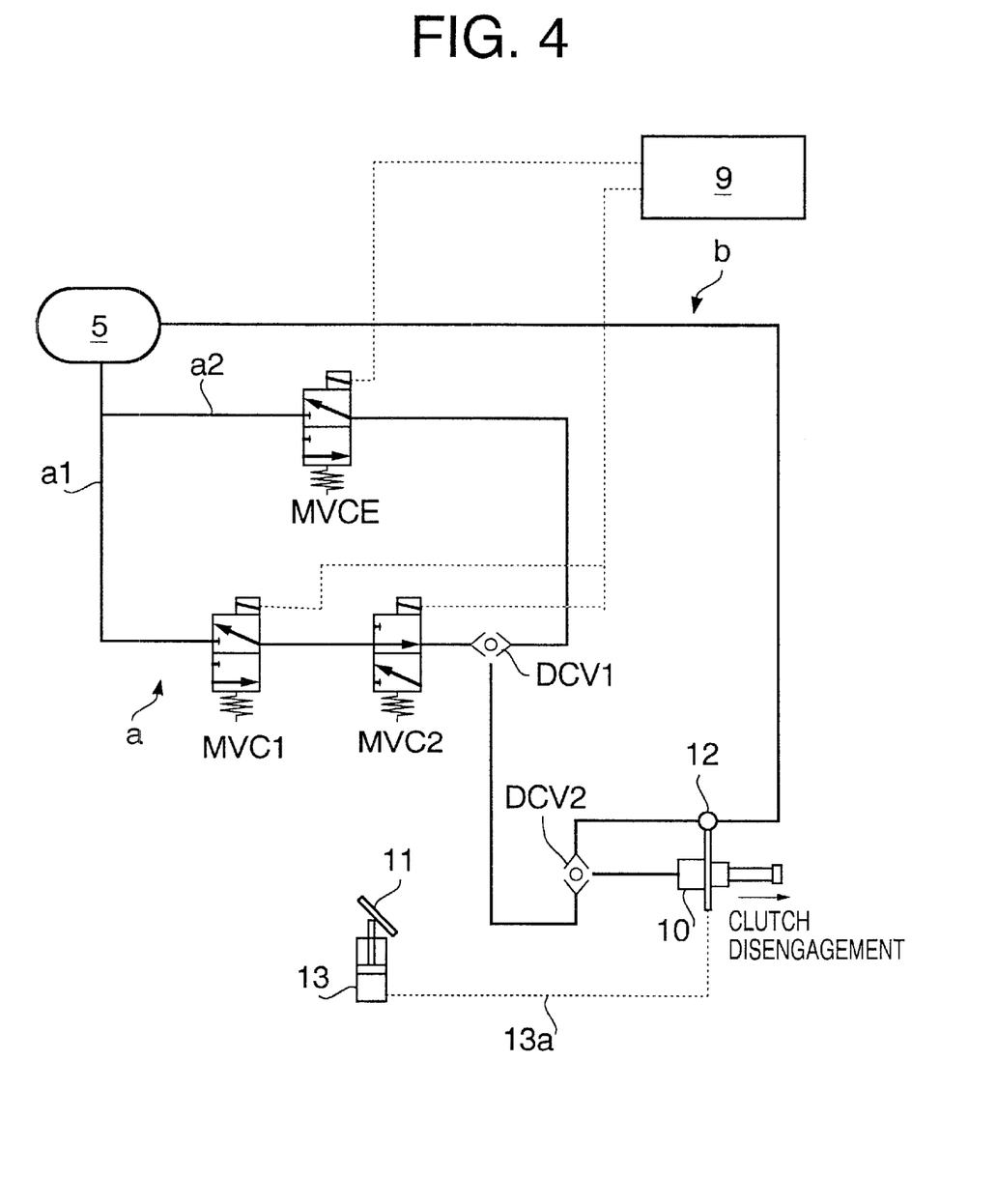
FIG. 4 illustrates an automatic clutch device employed in the system shown in FIG. 2.

As illustrated in FIGS. 2, 3 and 4, the clutch 2 is a mechanical friction clutch, and includes the flywheel 1b (input part of the clutch), a driven plate 2a (output part of the clutch), and a pressure plate 2b for frictionally contacting the driven plate 2a with the flywheel 1a and leaving the driven plate from the flywheel. The clutch 2 has a clutch booster 10 to cause the pressure plate 2b to move in an axial direction. The clutch 2 is generally disengaged and engaged in an automatic manner to lighten a driver's burden. When the clutch 2 should be operated delicately, e.g., when the vehicle is moved backward at a very slow speed, and when the clutch 2 should be disengaged suddenly, e.g., in an emergency case, it is also possible to disengage and engage the clutch 2 manually upon stamping of a clutch pedal 11. Thus, this is a so-called selective automatic clutch. A clutch stroke sensor 14 is provided for detecting a stroke of the clutch itself (i.e., position of the pressure plate 2b), and a clutch pedal stroke sensor 16 is provided for detecting how deep the clutch pedal 11 is stamped. These sensors are connected to TMCU 9.

As best illustrated in FIG. 4, the clutch booster 10 is connected to an air tank 5 via two air pipes "a" and "b" as indicated by the solid line, so that the clutch booster 10 is pneumatically activated by the air pressure supplied from the air tank 5. One of the air pipes "a" is used for automatic clutch disengagement and engagement, and the other air pipe "b" is used for manual clutch disengagement and engagement. The air pipe "a" is divided to two branch lines a1 and a2. On the first branch line a1, provided in series are two electromagnetic valves MVC1 and MVC2 for automatic disengagement and engagement. On the second branch line a2, provided is an electromagnetic valve MVCE for emergency case. At a position where these branch lines a1 and a2 meet, a double check valve DCV1 is provided. The air pipe "b" has a hydraulic valve 12 which is associated with the clutch booster 10. Another double check valve DCV2 is provided at a position where the air pipes "a" and "b" encounter. Each of the double check valves DCV1 and DCV2 is a three-way valve which is activated by differential pressure.

The electromagnetic valves MVC1, MVC2 and MVCE are turned on and off under the control of TMCU 9. When turned on, the electromagnetic valve connects its upstream side to the downstream side. When turned off, the electromagnetic valve blocks up the air so that the upstream side is disconnected from the downstream side, and the downstream side is released to the atmosphere. First, the automatic clutch operation will be described. The electromagnetic valve MVC1 is simply turned on and off in accordance with on and off of an ignition key. When the ignition key is in an off position, i.e., the vehicle is stopped, the electromagnetic valve MVC1 is turned off and interrupts the air pressure of the air tank 5. The electromagnetic valve MVC2 is a proportional control valve and able to arbitrarily control an amount (or flow rate) of air to be fed and discharged. This is necessary to control a speed of clutch disengagement and engagement. When both the electromagnetic valves MVC1 and MVC2 are turned on, the air pressure of the air tank 5 causes the double check valves DCV1 and DCV2 to switch so that the air pressure is applied to the clutch booster 10. This disengages the clutch. In order to engage the clutch, the electromagnetic valve MVC2 is only turned off. This releases the air pressure of the clutch booster 10 from the electromagnetic valve MVC2.

If abnormality occurs in either the electromagnetic valve MVC1 or MVC2 during clutch disengagement and that electromagnetic valve is turned off, the clutch is suddenly engaged in opposition to the driver's intent. Thus, if such abnormality is detected by an abnormality diagnosis circuit of TMCU 9, the electromagnetic valve MVCE is immediately turned on. This causes the air pressure passing through the electromagnetic valve MVCE to switch the double check valve DCV1 to the opposite side so that the air pressure is supplied to the clutch booster 10. As a result, the clutch disengaged condition is maintained and the sudden clutch engagement is prevented.

Next, the manual mode will be described. The hydraulic pressure is fed from and returned to the master cylinder 13 upon stamping and releasing of the clutch pedal 11. The hydraulic pressure is fed to the hydraulic valve 12 via an oil line 13a as indicated by the broken line to open and close the hydraulic valve 12 and in turn to feed and release the air pressure to and from the clutch booster 10 for manual disengagement and engagement of the clutch 2. As the hydraulic valve 12 is opened, the air pressure passing therethrough causes the double check valve DCV2 to switch so that the air pressure reaches the clutch booster 10. It should be noted that when the automatic clutch disengagement and engagement interferes with the manual clutch disengagement and engagement, priority is given to the manual disengagement and engagement.

As illustrated in FIG. 3 in detail, the transmission 3 is a basically "always engaged" type of multi-stage transmission, and has sixteen forward gear positions and two backward gear positions. The transmission 3 has a splitter assembly 17 as an auxiliary transmission on its input side, a range gear assembly 19 as another auxiliary transmission on its output side, and a main gear assembly 18 between these two auxiliary gear assemblies. The transmission 3 transfers a drive power of the engine 1 from the input shaft 15 to the splitter 17, main gear assembly 18, range gear assembly 19 and output shaft 4 in this order.

A gear shift unit GSU is provided for automatically shifting the transmission 3. GSU includes a splitter actuator 20, main actuator 21 and range actuator 22 for shifting the splitter assembly 17, main gear assembly 18 and range gear assembly 19 respectively. Like the clutch booster 10, these actuators are also pneumatically driven under the control of TMCU 9. A current gear position of each of the gear assemblies 17, 18 and 19 is detected by an associated gear position switch 23 (FIG. 2). The rotation speed of the countershaft 32 is detected by a countershaft rotation sensor 26, and that of the output shaft 4 is detected by an output shaft rotation sensor 28. These detection signals are fed to TMCU 9.

The automatic transmission described above also possesses a manual mode so that the transmission can be shifted up and down in response to a shift lever movement caused by the driver. In the manual mode, as illustrated in FIG. 2, a gear position change signal issued from a shift lever unit 29 located next to a driver' seat triggers disengagement and engagement of the clutch 2 and gear position change of the transmission 3. Specifically, when the driver moves a shift lever 29a of the shift lever unit 29, a shift switch installed in the shift lever unit 29 is turned on to output the gear position change signal to TMCU 9. Upon receiving this signal, TMCU 9 selectively and/or cooperatively causes the clutch booster 10, splitter actuator 20, main gear actuator 21 and range gear actuator 22 to operate so as to perform a series of shift up (or down) operations (clutch disengagement, gear disengagement, gear engagement and clutch engagement). TMCU 9 also causes a monitor 31 to display a current gear position. Therefore, the shift switch incorporated in the shift lever unit 29 is a manual shift switch of the invention. This manual shift switch is turned on by the shift lever movement in this embodiment.

In the shift lever unit 29, "R" represents reverse, "N" neutral, "D" drive, "UP" shift up, and "DOWN" shift down.

Next to the driver' seat, also provided are a mode switch 24 for switching of shift mode between the manual mode and automatic mode, and a skip switch 25 for switching between gear-by-gear shifting and every other gear shifting.

In the automatic shift mode, if the shift lever 29*a* is in the D range, the transmission is automatically shifted up and down in accordance with the vehicle speed. It should be noted that even in the automatic shift mode, if the driver moves the shift lever 29*a* to UP or DOWN, the transmission is manually shifted. In the automatic shift mode, if the skip switch 25 is turned off (normal mode), the transmission gear position change takes place one gear at a time. This is advantageous when a tractor tows a trailer with a relatively heavy load. When the skip switch 25 is turned on (skip mode), the gear position change occurs every other gear (e.g., from first gear to third gear). This is advantageous when the tractor does not tow the trailer or tows the trailer with a relatively light load.

On the other hand, when the manual shift mode is selected, the gear position change is effected completely according to the driver's intention. When the shift lever 29*a* is in the D range, no gear position takes place and a current gear position is maintained. Only when the driver operates the shift lever 29*a* to UP or DOWN, the transmission 3 is shifted up or down. If the skip switch 25 is turned off, the gear position change occurs one gear by one gear. If the skip switch 25 is turned on, the gear position change occurs every other gear. In this mode, the D range is an H (hold) range to keep a current gear position.

An emergency shift switch 27 is also provided in the vicinity of the driver' seat. In case an electromagnetic valve of GSU fails, for instance, the driver presses an ON button and turns a knob to shift the transmission 3.

As illustrated in FIG. 3, the transmission 3 includes the input shaft 15, main shaft 33 and output shaft 4 that are arranged coaxially, and a countershaft 32 that extends below and in parallel to these shafts. The input shaft 15 is coupled to the driven plate 2*a* of the clutch 2. The input shaft 15 and main shaft 33 are supported such that they can rotate relative to each other.

Next, the structures of the splitter assembly 17 and main gear assembly 18 will be described. A split high gear SH is rotatably mounted on the input shaft 15. Main gears M4, M3, M2, M1 and MR are rotatably mounted on the main shaft 33 in this order from the front. These gears SH, M4, M3, M2 and M1 except for the gear MR always mesh with counter gears CH, C4, C3, C2 and C1 fixed on a counter shaft 32 respectively. The gear MR always meshes with an idle reverse gear IR, and the idle reverse gear IR always meshes with a counter gear CR secured on the counter shaft 32.

The gears SH, M4, . . . mounted on the input shaft 15 and main shaft 33 have splines 36 for selection of themselves. In the vicinity of these splines 36, provided are first to fourth splines 37 to 40 fixed to the input shaft 15 and main shaft 33. First to fourth sleeves 42 to 45 always engage with the first to fourth splines 37 to 40 such that they can slide back and forth. By selectively sliding the first to fourth sleeves 42 to 45 to cause them to engage with and disengage from the splines 36 of the gears, a particular transmission gear is selected or the transmission is brought into a neutral condition (geared in and out). Movement of the first sleeve 42 is made by the splitter actuator 20, and those of the second to fourth sleeves 43 to 45 are made by the main actuator 21.

In this manner, the splitter assembly 17 and main gear assembly 18 have an "always-engaged" type structure that is automatically shifted up and down by the associated actuators 20 and 21. It should be noted that a spline portion of the splitter assembly 17 has an ordinary mechanical synchronization unit, but a spline portion of the main gear assembly 18 does not. Because of this, a so-called synchronization control is performed to match the engine revolution speed with the gear rotation speed so that the shifting can be made without the synchronization unit. Here, not only the main gear assembly 18 but also the splitter gear assembly 17 have a neutral position so as to prevent rattle noise of gears. The detail of the neutral position of the splitter gear assembly can be found in Japanese Patent Application No. 11-319915 or corresponding U.S. patent application Ser. No. 09/707,897 filed on Nov. 7, 2000, entitled "MULTI-STAGE TRANSMISSION OF VEHICLE" (Attorney Docket No. 5616-0027, ISZ-US-89), the entire disclosures of which are incorporated herein by reference.

Next, the range gear assembly 19 will be described. The range gear assembly 19 has a planetary gear mechanism 34 and is shiftable to a high or low position. The planetary gear mechanism 34 includes a sun gear 65 secured on the rear end of the main shaft 33, a plurality of planetary gears 66 meshing with the outer periphery of the sun gear, and a ring gear 67 having inner teeth in mesh with the planetary gears 66. The planetary gears 66 are rotatably supported by a common carrier 68 that is connected to the output shaft 4. The ring gear 67 has a tubular portion 69 that is rotatably fit over the output shaft 4. The tubular portion 69 and the output shaft 4 constitute a double shaft structure.

A fifth spline 41 extends from the tubular portion 69. Closely behind the fifth spline 41, provided is an output shaft spline 70 extending from the output shaft 4. In close front of the fifth spline 41, provided is a stationary spline 71 fixed to the transmission casing. A fifth sleeve 46 always meshes with the fifth spline 41 such that it can slide back and forth. Movement of the fifth sleeve 46 is controlled by the range gear actuator 22. Spline portions of the range gear assembly 19 have synchronization mechanisms.

When the fifth sleeve 46 moves forwards, it engages with the fixed spline 71 so that the fifth spline 41 is coupled to the fixed spline 71. This causes the ring gear 67 to be secured on the transmission casing and the output shaft 4 is caused to rotate at a reduction ratio greater than one. This is the low gear position.

On the other hand, if the fifth sleeve 46 moves backwards, it engages with the output shaft spline 70 so that the fifth spline 41 is coupled with the output shaft spline 70. As a result, the ring gear 67 and carrier 68 are fixed relative to each other, and the output shaft 4 is directly rotated at a reduction ratio of one. This is the high gear position.

As described above, the transmission 3 has two gear positions (high and low gear positions) in the splitter assembly 17, four gear positions in the main gear assembly 18, and two gear positions (high and low) in the range gear assembly 19 when in the forward mode. In sum, the transmission 3 can be shifted from the first to the sixteenth gear positions (2×4×2=16). In the backward mode, the transmission 3 has two gear positions (high and low) upon switching of the splitter assembly 17.

Next, the actuators 20, 21 and 22 will be described. Each actuator includes one or more pneumatic cylinders activated by the air pressure from the air tank 5, and a plurality of electromagnetic valves for switching between application and releasing of the air pressure to and from the pneumatic cylinders. These electromagnetic valves are selectively operated by TMCU 9 so that the pneumatic cylinders are selectively activated.

The splitter actuator 20 includes a pneumatic cylinder 47 and three electromagnetic valves MVH, MVF and MVG. The pneumatic cylinder 47 has a double piston. When the splitter assembly 17 should be in a neutral condition, the electromagnetic valve MVH is turned on, the electromagnetic valve MVF is turned off and the electromagnetic valve MVG is turned on. When the splitter assembly 17 should be shifted to the high gear position, the electromagnetic valve MVH is turned off, the electromagnetic valve MVF is turned off and the electromagnetic valve MVG is turned on. In order to shift the splitter assembly 17 to the low gear position, the electromagnetic valve MVH is turned off, the electromagnetic valve MVF is turned on and the electromagnetic valve MVG is turned off.

The main gear assembly actuator 21 includes a pneumatic cylinder 48 for gear selection, another pneumatic cylinder 49 for shifting, three electromagnetic valves MVC, MVD and MVE associated with the first pneumatic cylinder 48 and two electromagnetic valves MVB and MVA associated with the second pneumatic cylinder 49. The first pneumatic cylinder 48 has a double piston and the second pneumatic cylinder 49 has a single piston.

When the electromagnetic valve MVC is turned off, the electromagnetic valve MVD is turned on and the electromagnetic valve MVE is turned off, the first pneumatic cylinder 48 is moved downwards in the drawing so that the third and fourth gears and N3 (neutral position between the third and fourth gears) of the main gear assembly can be selected. When the electromagnetic valve MVC is turned on, the electromagnetic valve MVD is turned off and the electromagnetic valve MVE is turned on, the first pneumatic cylinder 48 is moved into the neutral condition so that the first and second gears and N2 (neutral position between the first and second gears) of the main gear assembly can be selected. When the electromagnetic valve MVC is turned on, the electromagnetic valve MVD is turned off and the electromagnetic valve MVE is turned off, the first pneumatic cylinder 48 is moved upwards in the drawing so that the reverse gear and N1 of the main gear assembly are selectable.

The second pneumatic cylinder 49 is brought into the neutral condition when the electromagnetic valve MVA is turned on and the electromagnetic valve MVB is turned on. This allows selection of N1, N2 and N3 of the main gear assembly. When the electromagnetic valve MVA is turned on and the electromagnetic valve MVB is turned off, the pneumatic cylinder 49 is moved to the left in the drawing so that the second, fourth and reverse gears can be selected. When the electromagnetic valve MVA is turned off and the electromagnetic valve MVB is turned on, the pneumatic cylinder 49 is moved to the right so that the first and third gears of the main gear assembly can be selected.

The range gear actuator 21 includes a pneumatic cylinder 50 with a single piston, and two electromagnetic valves MVI and MVJ. The pneumatic cylinder 50 is moved to the right in the drawing when the electromagnetic valve MVI is turned on and the electromagnetic valve MVJ is turned off. This shifts the range gear assembly to the high gear position. On the other hand, the pneumatic cylinder 50 is moved to the left in the drawing when the electromagnetic valve MVI is turned off and the electromagnetic valve MVJ is turned on to shift the range gear assembly to the low gear position.

In order to brake the countershaft 32 for the above-mentioned synchronization control, the countershaft 32 is equipped with a countershaft brake 27. This brake 27 is a wet multiple plate type brake and actuated by the air pressure from the air tank 5. Application and non-application of the air pressure is switched by an electromagnetic valve MV BRK. When the electromagnetic valve MV BRK is turned on, the air pressure is applied to the countershaft brake 27 to apply a brake force to the counter shaft. When the electromagnetic valve MV BRK is turned off, the air pressure is allowed to escape from the countershaft brake 27 so that no brake force acts on the countershaft. More detail of the counter shaft brake can be found in Japanese Patent Application No. 2000-83274 or corresponding U.S. patent application Ser. No. 09/770,117 filed on Jan. 23, 2001, entitled "LUBRICATION SYSTEM FOR COUNTERSHAFT BRAKE" (Attorney Docket No. 5616-0032, ISZ-US-94), the entire disclosures of which are incorporated herein by reference.

Figure 5:
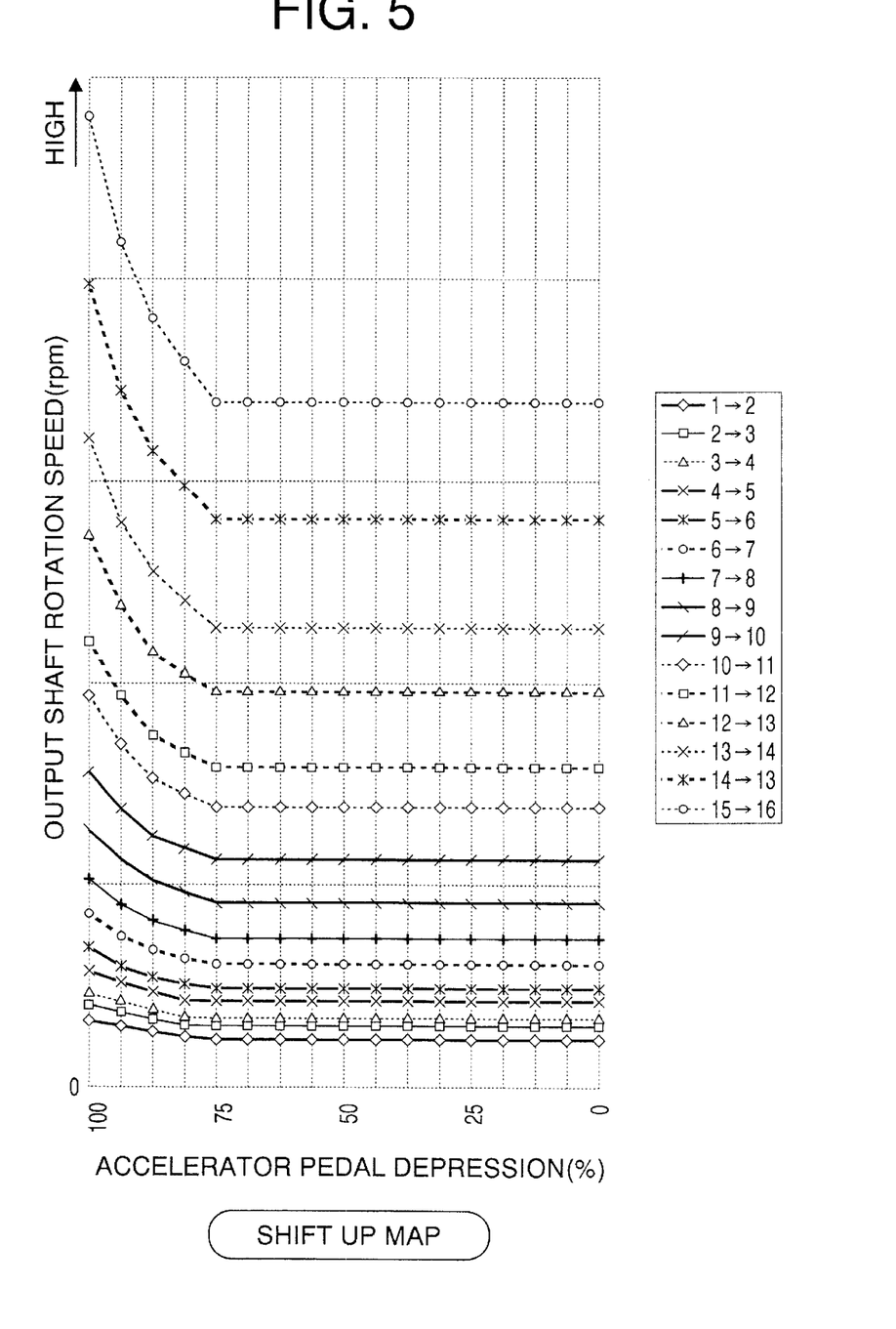
FIG. 5 illustrates a shift up map.
Figure 6:
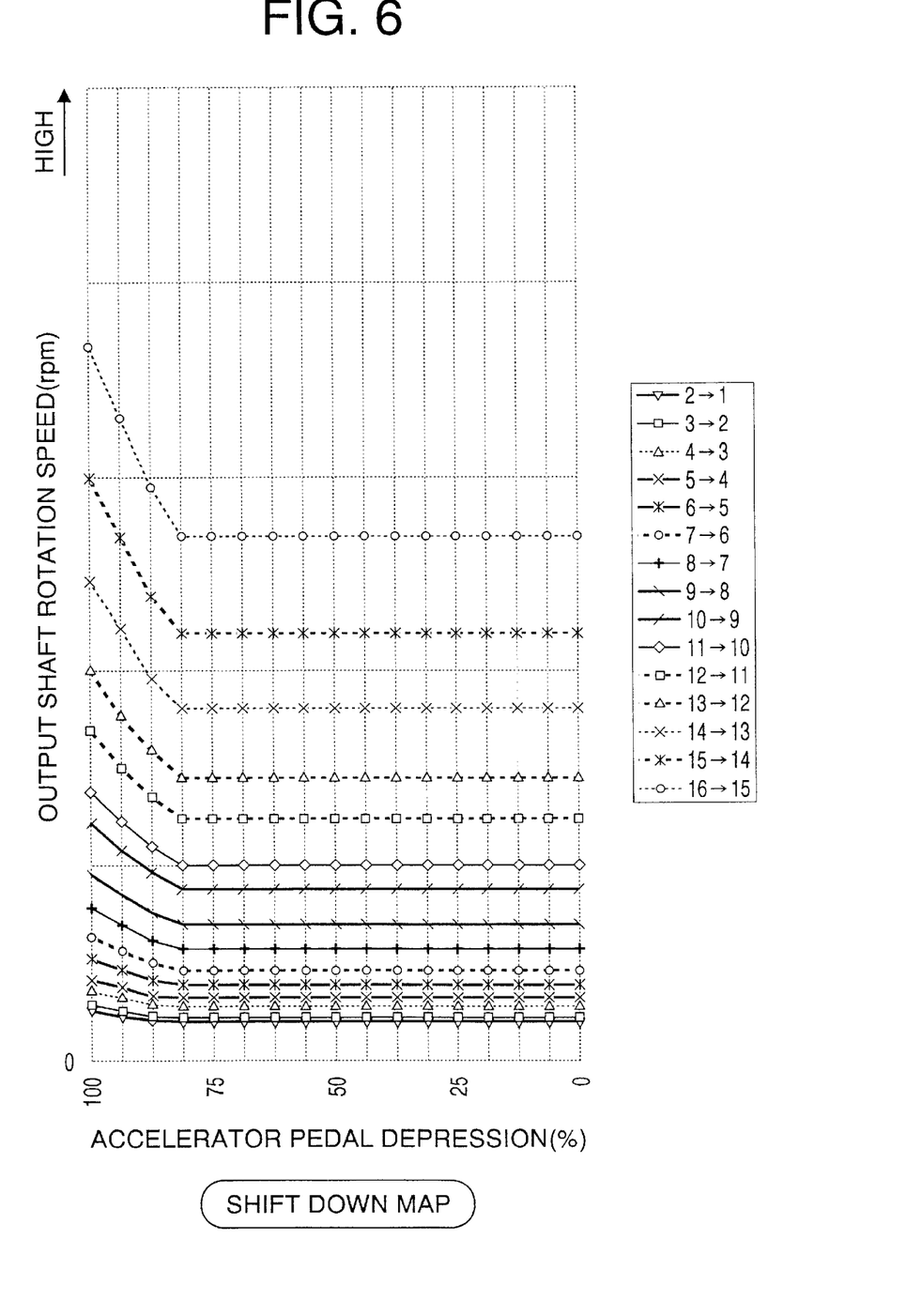
FIG. 6 illustrates a shift down map.

Next, the automatic shift control will be described. TMCU 9 has a shift up map as illustrated in FIG. 5 and a shift down map as illustrated in FIG. 6 in its memory. In the automatic shift mode, TMCU 9 conducts the automatic shifting according to these maps. For example, in the shift up map of FIG. 5, a shift up curve from an n'th gear (n is an integer from one to fifteen) to an n+1'th gear is determined from an accelerator pedal depression (accelerator opening) (%) and output shaft rotation speed (rpm). In the map, a single point is determined from current accelerator depression and output shaft rotation speed. When the vehicle is accelerated, the rotation speed of the output shaft 4 connected to wheels gradually increases. Therefore, in the normal automatic shift mode, the transmission is shifted up one gear by one gear every time a current point passes over a nearest shift up curve. If the skip mode is selected, the transmission is shifted up every other gear as a current point passes over a shift up curve above the nearest shift up curve.

As in FIG. 5, the shift down map of FIG. 6 has a shift down curve from an n+1'th gear to an n'th gear, which is determined from the accelerator pedal depression (%) and output shaft rotation speed (rpm). A single point is defined from current accelerator pedal depression and output shaft rotation speed. When the vehicle is decelerated, the rotation speed of the output shaft 4 gradually drops. In the normal automatic shift mode, therefore, the transmission is shifted down one gear at a time as a current point passes over a nearest shift down curve. In the skip mode, the shifting down occurs every other gear.

In the manual mode, the driver can arbitrarily shift up and down the transmission independently of these maps. In the normal mode, a single gear position change operation made by the driver causes the shifting by one gear. In the skip mode, the shifting occurs by two gears upon a single gear position change operation.

Current accelerator depression is detected by an accelerator pedal sensor 8 (FIG. 2), and current output shaft rotation speed is detected by the output shaft rotation speed sensor 28. TMCU 9 calculates a current vehicle speed from the current output shaft rotation speed, and indicates it in a speedometer. In this manner, the vehicle speed is indirectly determined from the output shaft rotation speed. The output shaft rotation speed is proportional to the vehicle speed.

Now, control for preventing the engine from stalling and protecting the clutch according to the present invention will be described. It should be assumed here that the driver stamps the brake pedal to decelerate the vehicle while maintaining the current gear position during the manual mode driving, and then stamps the accelerator pedal to accelerate the vehicle. In the course of deceleration, when the engine rotation speed drops close to the idling rotation, the clutch is automatically disengaged since there is a possibility of stalling. The clutch is maintained in the disengaged condition until the accelerator pedal is depressed for acceleration. However, if the driver depresses the accelerator pedal when the gear position is high, the clutch is engaged with the too high gear. This results in stalling and excessive slip and wear of the clutch. The present invention prevents such shortcoming. Specifically, when the accelerator pedal is stamped, the transmission is automatically shifted down to an appropriate gear position prior to clutch engagement regardless of the gear position change signal from the manual shift switch. In other words, even if the driver does not move the shift lever at all and maintains the current gear position, the appropriate gear position is automatically selected before the clutch is engaged.

Figure 1:
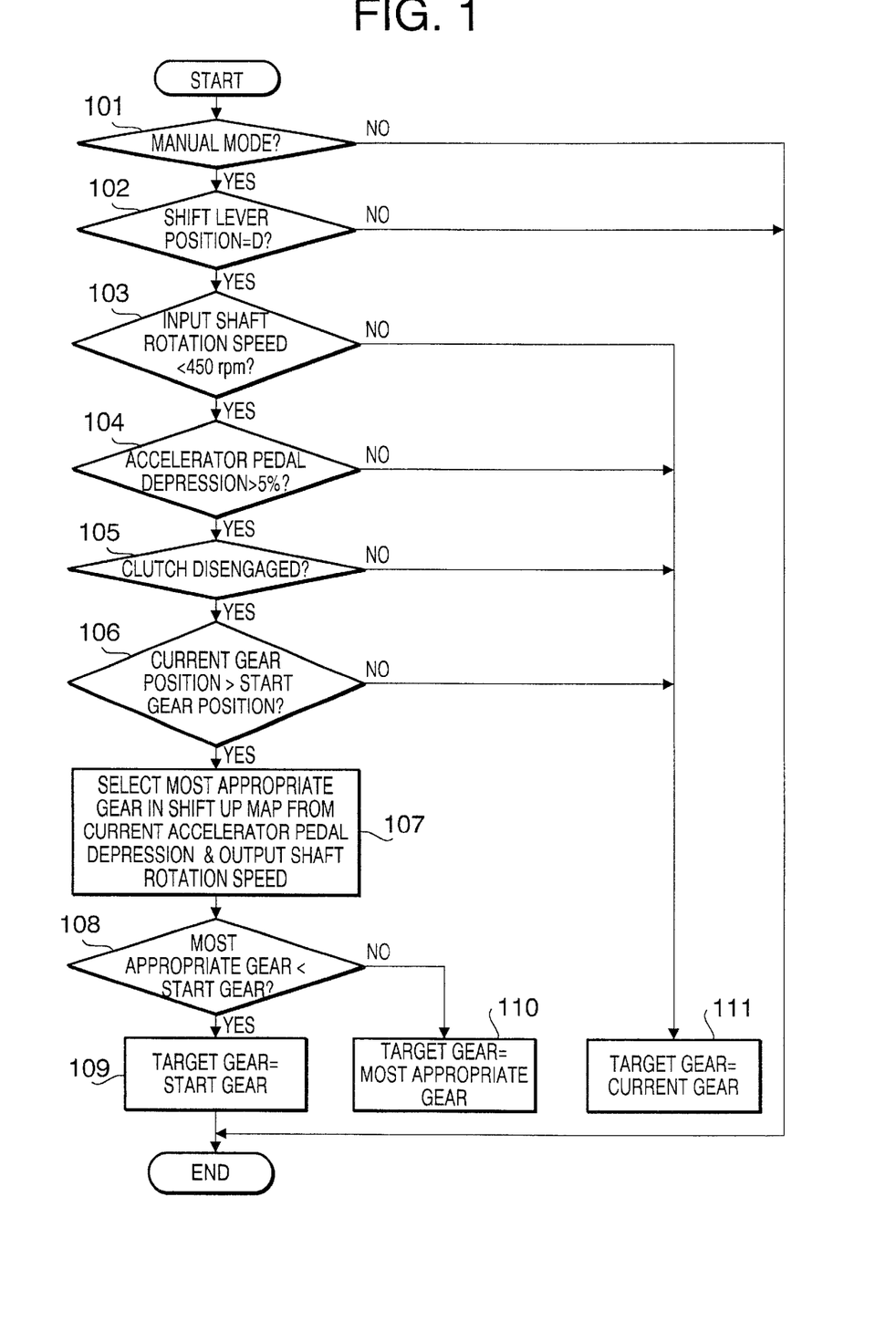
FIG. 1 illustrates a flowchart of stall and clutch excessive wear prevention control according to the present invention.

Referring to FIG. 1, TMCU 9 determines at S101 whether the current mode is a manual mode from the output of the mode switch 24. If the manual mode has been selected, the program proceeds to S102. If not, the program advances to END. This is because stalling and excessive clutch slip upon acceleration after deceleration occur only in the manual mode. In the automatic mode, the transmission is automatically shifted down in accordance with the vehicle speed so that such problems would not occur. Whether the skip mode is selected or not is out of question as far as the engine stall and clutch excessive slip prevention is concerned.

At S102, it is determined whether the current shift lever position is in the D (H in the manual mode) from the signal of the shift lever unit 29. One of the conditions to perform the stall prevention control is that the driver does not move the shift lever for shifting up or down. If it is the D, the program proceeds to S103. If not, the program proceeds to END to wait for completion of shifting.

At S103, it is determined whether the rotation speed of the input shaft 15 (or rotation speed of the clutch) is smaller than a predetermined value (e.g., 450 rpm). If the input shaft rotation speed is not smaller than 450 rpm, the program proceeds to S111. At S111, the current gear position is memorized as a target gear position for the next shifting. Thus, no shifting is effected. On the other hand, if the input shaft rotation speed is less than 450 rpm, the program proceeds to S104. Here, the engine idling rotation speed is 500 rpm, and the stall prevention control is performed when the input shaft rotation speed becomes smaller than the idling speed. This is because the clutch is surely disengaged in this situation. Further, if the transmission was automatically shifted down in spite of the rotation speed being not so low, the driver might feel uncomfortable. Nevertheless, in actuality, the clutch is disengaged during the deceleration when the input shaft rotation speed becomes about 900 rpm, for instance, which is slightly higher than the idling speed. In this manner, the stall prevention control of the present invention is primarily applied when the clutch is disengaged near the idling rotation.

The input shaft rotation speed is calculated from the countershaft rotation speed detected by the countershaft rotation speed sensor 26. TMCU 9 memorizes the numbers of teeth of the gears in the transmission and respective gear ratios, and obtains the input shaft rotation speed N1 from the equation shown below based on the countershaft rotation speed N2, the number of the teeth Z1 of the split high gear SH (input gear) and the number of the teeth Z2 of the counter gear CH (input counter gear).

$$N1=(Z2/Z1) \times N2$$

At S104, it is determined whether the current accelerator pedal depression exceeds a predetermined value (e.g., 5%) from the output of the accelerator pedal sensor 8. If the accelerator pedal is stamped over 5%, TMCU 9 determines that the driver wants to accelerate the vehicle so that the clutch is automatically engaged. If the answer at S104 is yes, the program advances to S105. If no, the program advances to S111.

At S105, it is determined whether the clutch is currently disengaged from the output of the clutch stroke sensor 14. This step is necessary because even if the clutch disengagement is assumed from the answer at S103, there is a possibility that the clutch is in actuality not disengaged due to interference with other control and/or malfunctioning and abnormality. It should be noted, however, that S105 is provided to just make sure that the clutch is indeed disengaged. If the clutch is not engaged at S105, the program proceeds to S106. Otherwise, the program proceeds to S111.

At S106, the current gear position detected by the gear position switch 23 is compared with a predetermined start gear position (e.g., fourth or ninth gear) stored in TMCU 9. If the current gear is higher than the predetermined start gear, it means that the driver shifts down the transmission sufficiently during the deceleration by his or her own intent. In such case, the stall prevention control is not conducted. Therefore, the program proceeds to S111. If the current gear is greater than the predetermined gear, on the other hand, the program proceeds to S107.

At S107, a most appropriate gear is selected in the shift up map shown in FIG. 5 from the current accelerator pedal depression detected by the accelerator pedal sensor 8 and the current output shaft rotation speed detected by the output shaft rotation sensor 28. At the subsequent step, the selected most appropriate gear is compared with the preset start gear. If the former is smaller than the latter, the program proceeds to S109 to employ the preset start gear as the target gear. If the answer at S108 is no, the program goes to S110 to employ the selected most appropriate gear as the target gear. In this manner, the higher one is used as the target gear.

After deciding the target gear, the transmission is automatically shifted to that target gear. Accordingly, appropriate shift down occurs. After that, the clutch is automatically engaged for subsequent acceleration of vehicle.

According to the stall prevention control of the present invention, when the driver stamps the accelerator pedal to raise the vehicle speed after deceleration, the transmission is first automatically shifted down to a gear position suited to the vehicle running condition and then the clutch is engaged. Therefore, the engine will not stall and the clutch will not slip excessively upon clutch engagement. This improves driver's comfort and protects the clutch.

The higher one of the selected most appropriate gear and preset start gear is utilized as the target gear for subsequent acceleration of the vehicle since the transmission should be shifted to a gear not smaller than the preset start gear. For instance, if the vehicle is decelerated to a very slow speed while the high gear position is maintained, the transmission might be shifted down to a gear lower than the preset start gear (e.g., first or second gear) as far as the control is performed in accordance with the shift down map. If it happens, the driver experiences a shock upon clutch engagement and/or the engine revolution speed suddenly and steeply rises, which also makes the driver uncomfortable. In order to prevent such discomfort, a gear at least equal to the predetermined start gear is used in the present invention. If the vehicle is running at a certain speed when the driver intends to accelerate the vehicle, the preset start gear may be too low. In this case, the most appropriate gear selected from the map is utilized. Accordingly, the driver does not experience uncomfortable acceleration and clutch engagement.

It should be noted that the present invention is not limited to the illustrated and described embodiment. For example, the most appropriate gear is not determined necessarily from the accelerator pedal depression and output shaft rotation speed. The vehicle speed may be employed instead of the output shaft rotation speed. The map used is not limited to the shift up map of FIG. 5. The manual shift switch may be provided on or in a steering wheel.

It should also be noted that the transmission control unit 9 may be divided to three controllers such that a first controller automatically shifts the transmission 3 according to a gear position change signal issued from the manual shift switch 29a, a second controller automatically disengages the clutch 2 when automatic shifting takes place, and automatically engages the clutch 2 when accelerator pedal depression exceeds a predetermined value in a clutch disengaged condition, and a third controller decides a most appropriate gear in accordance with a current vehicle running condition, selects a higher one of the most appropriate gear and a predetermined start gear as a target gear, and shifts the transmission 3 to the target gear regardless of the gear position change signal from the manual shift switch 29a when the accelerator pedal depression 8 exceeds a prescribed amount in the clutch disengaged condition, and then engaging the clutch 2.

What is claimed is:

1. An automatic transmission apparatus comprising:
    a first controller for automatically shifting a transmission according to a gear position change signal issued from a manual shift switch;
    a second controller for automatically disengaging a clutch when automatic shifting takes place, and for automatically engaging the clutch when accelerator pedal depression exceeds a predetermined value in a clutch disengaged condition; and
    a third controller for deciding a most appropriate gear in accordance with a current vehicle running condition, for selecting a higher one of the most appropriate gear and a predetermined start gear as a target gear, and for shifting the transmission to the target gear regardless of the gear position change signal from the manual shift switch when the accelerator pedal depression exceeds a prescribed amount in the clutch disengaged condition, and then engaging the clutch.

2. The automatic transmission apparatus as in claim 1, wherein the most appropriate gear is decided in a map from current accelerator pedal depression and a rotation speed of an output shaft of the transmission.

3. The automatic transmission apparatus as in claim 1, wherein the gear position change signal is issued from the manual shift switch in response to a shift lever movement.

4. The automatic transmission apparatus as in claim 1, wherein the clutch is disengaged when a rotation speed of an input shaft of the transmission drops below a value near an engine idling rotation speed.

5. The automatic transmission apparatus as in claim 4, wherein the value near an engine idling rotation speed is 450 rpm.

6. The automatic transmission apparatus as in claim 1, wherein the predetermined value is 5% of an entire accelerator pedal stroke.

7. The automatic transmission apparatus as in claim 1, wherein the clutch is a mechanical friction clutch.

8. An apparatus comprising:
    means for automatically shifting a transmission according to a gear position change signal issued from a manual shift switch;
    means for automatically disengaging a clutch when automatic shifting takes place, and for automatically engaging the clutch when accelerator pedal depression exceeds a predetermined value in a clutch disengaged condition; and
    means for deciding a most appropriate gear in accordance with a current vehicle running condition, for selecting a higher one of the most appropriate gear and a predetermined start gear as a target gear, and for shifting the transmission to the target gear regardless of the gear position change signal from the manual shift switch when the accelerator pedal depression exceeds a prescribed amount in the clutch disengaged condition, and then engaging the clutch.

9. The apparatus as in claim 8, wherein the most appropriate gear is decided in a map from current accelerator pedal depression and a rotation speed of an output shaft of the transmission.

10. The apparatus as in claim 9, wherein the gear position change signal is issued from the manual shift switch in response to a shift lever movement.

11. The apparatus as in claim 10, wherein the clutch is disengaged when a rotation speed of an input shaft of the transmission drops below a value near an engine idling rotation speed.

12. The apparatus as in claim 11, wherein the value near an engine idling rotation speed is 450 rpm.

13. The apparatus as in claim 12, wherein the predetermined value is 5% of an entire accelerator pedal stroke.

14. The automatic transmission apparatus as in claim 13, wherein the clutch is a mechanical friction clutch.

15. A method comprising the steps of:
    A) automatically shifting a transmission according to a gear position change signal issued from a manual shift switch;
    B) automatically disengaging a clutch when automatic shifting takes place, and automatically engaging the clutch when accelerator pedal depression exceeds a predetermined value in a clutch disengaged condition; and
    C) deciding a most appropriate gear in accordance with a current vehicle running condition, selecting a higher one of the most appropriate gear and a predetermined start gear as a target gear, and shifting the transmission to the target gear regardless of the gear position change signal from the manual shift switch when the accelerator pedal depression exceeds a prescribed amount in the clutch disengaged condition, and then engaging the clutch.

16. The method as in claim 15, wherein the most appropriate gear is decided in a map from current accelerator pedal depression and a rotation speed of an output shaft of the transmission.

17. The method as in claim 16, wherein the gear position change signal is issued from the manual shift switch in response to a shift lever movement.

18. The method as in claim 17, wherein the clutch is disengaged when a rotation speed of an input shaft of the transmission drops below a value near an engine idling rotation speed.

19. The method as in claim 18, wherein the value near an engine idling rotation speed is 450 rpm.

20. The method as in claim 19, wherein the predetermined value is 5% of an entire accelerator pedal stroke.

* * * * *